| United States Patent [19] | [11] Patent Number: 5,126,587 |
|---|---|
| Preller et al. | [45] Date of Patent: Jun. 30, 1992 |

[54] SYNCHRONIZATION CIRCUIT CONFIGURATION

[75] Inventors: Peter Preller; Andreas Grubert, both of Munich, Fed. Rep. of Germany

[73] Assignee: Siemens Aktiengesellschaft, Munich, Fed. Rep. of Germany

[21] Appl. No.: 675,318

[22] Filed: Mar. 26, 1991

[30] Foreign Application Priority Data

Mar. 26, 1990 [EP] European Pat. Off. ........ 9010571107

[51] Int. Cl.⁵ .......................... H03L 7/00; H03K 5/22; H03K 21/08
[52] U.S. Cl. ..................................... 307/269; 378/63; 378/72
[58] Field of Search ............... 307/969, 247.1; 378/63, 378/72

[56] References Cited

U.S. PATENT DOCUMENTS

| 3,590,280 | 11/1969 | Hudson et al. | 307/269 |
|---|---|---|---|
| 3,908,084 | 9/1975 | Wiley | 370/108 |
| 4,408,333 | 10/1983 | Fujii | 328/63 |
| 4,996,444 | 2/1991 | Thomas et al. | 307/269 |

FOREIGN PATENT DOCUMENTS

| 3332939 | 3/1985 | Fed. Rep. of Germany . |
|---|---|---|
| 2567697 | 1/1986 | France . |
| -5748841 | 3/1982 | Japan . |
| 59-190754 | 10/1984 | Japan . |
| 61-164354 | 7/1986 | Japan . |

OTHER PUBLICATIONS

IEEE Transactions on Computers, vol. C-25, No. 2, Feb. 1976, pp. 133-139; M. Pechoucek: "Anomalous response times of input synchronizers"; Figure 7.
Tietze Schenk, 8 Auflage, pp. 255-256, Figure 10.49.

Primary Examiner—Eugene R. LaRoche
Assistant Examiner—Tan Dinh
Attorney, Agent, or Firm—Herbert L. Lerner; Laurence A. Greenberg

[57] ABSTRACT

A circuit configuration for synchronizing pulse-shaped signals includes a clock-controlled flip-flop having a data input for receiving a pulse-shaped signal to be synchronized, a data output for supplying a synchronized signal, and a clock input. A test circuit has an input connected to the data input of the clock-controlled flip-flop for receiving the pulse-shaped signal to be synchronized, another input for receiving at least one clock signal, and an output connected to the clock input of the clock-controlled flip-flop. The test circuit generates an output signal at the output of the test circuit to be supplied to the clock input of the clock-controlled flip-flop being either equal to or phase-offset relative to the at least one clock signal supplied to the other input of the test circuit. The test circuit ascertains a phase difference between an edge of the pulse-shaped signal to be weighted and a weighting edge of the output signal of the test circuit. The output signal of the test circuit is switched to the other respective clock signal if the phase difference is below a predefined value.

9 Claims, 3 Drawing Sheets

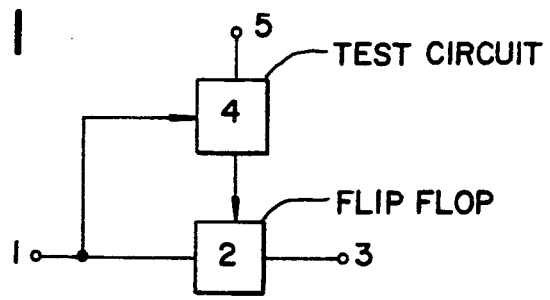
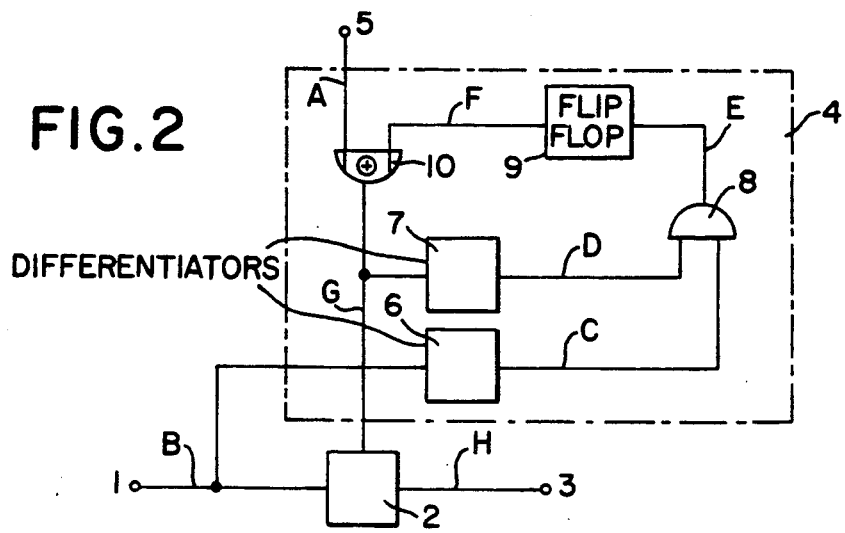
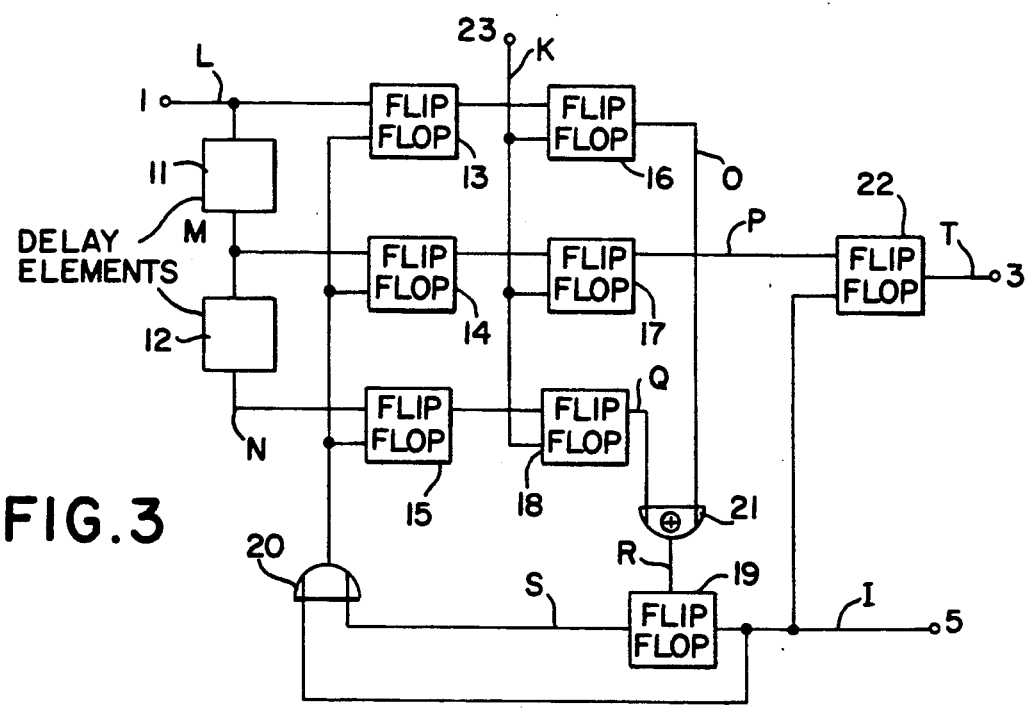

SYNCHRONIZATION CIRCUIT CONFIGURATION

BACKGROUND OF THE INVENTION

1. Field of the Invention

The invention relates to a circuit configuration for synchronizing pulse-shaped signals, having a clock-controlled flip-flop with a data input, a data output and a clock input, the pulse-shaped signal to be synchronized is supplied to the data input of the flip-flop, and the synchronized signal can be picked up at the data output of the flip-flop.

2. Description of the Related Art

Such a circuit configuration for synchronizing asynchronous pulse-shaped signals is known, for instance, from the book entitled Halbleiter-Schaltungstechnik [Semiconductor Circuitry], by Tietze and Schenk, 8th edition, pages 255–256, in particular FIG. 10.49 thereof. In that case, the asynchronous signal is supplied to the data input of a clock-controlled flip-flop. The system clock pulse with which synchronizing is to be carried out is present at the clock input of the flip-flop. The synchronized data signal can then be picked up at the data output of the flip-flop. The asynchronous signal is weighted with the leading and/or trailing edge of the system pulse. In digital circuits, such as large scale integrated MOS circuits, slow phase shifts sometimes occur between the system clock signals of a signal-transmitting circuit and those of a signal-processing circuit. Usually, such shifts can be ascribed to thermal effects. If a leading or trailing edge of the data signal is located at the input of the signal-processing circuit at the instant of weighting by its system clock pulse, the result is weighting uncertainty, which leads to jittering having the width of one clock period.

It is accordingly an object of the invention to provide a synchronization circuit configuration, which overcomes the hereinafore-mentioned disadvantages of the heretofore-known devices of this general type and which improves a circuit configuration for synchronizing pulse-shaped signals in such a way that it assures jitter-free synchronization.

SUMMARY OF THE INVENTION

With the foregoing and other objects in view there is provided, in accordance with the invention, a circuit configuration for synchronizing pulse-shaped signals, comprising a clock-controlled flip-flop having a data input for receiving a pulse-shaped signal to be synchronized, a data output for supplying a synchronized signal, and a clock input; a test circuit having an input connected to the data input of the clock-controlled flip-flop for receiving the pulse-shaped signal to be synchronized, another input for receiving at least one clock signal, and an output connected to the clock input of the clock-controlled flip-flop; the test circuit having means for generating an output or clock signal at the output of the test circuit to be supplied to the clock input of the clock-controlled flip-flop being either equal to or phase-offset relative to the at least one clock signal supplied to the other input of the test circuit; the test circuit having means for ascertaining a phase difference between an edge of the pulse-shaped signal to be weighted and a weighting edge of the output signal of the test circuit; and means for switching the output signal of the test circuit to the other respective clock signal if the phase difference is below a predefined value.

In accordance with another feature of the invention, the means for switching the output signal of the test circuit invert the at least one clock signal.

In accordance with a further feature of the invention, the means for ascertaining the phase difference include a first differentiator receiving the pulse-shaped signal to be synchronized and supplying an output signal; a second differentiator receiving the output signal of the test circuit and supplying an output signal; and a logical AND gate receiving the output signals of the differentiators and supplying an output signal.

In accordance with an added feature of the invention, there is provided a further flip-flop having a data input receiving the output signal of the AND gate and an output supplying an output signal; an EXCLUSIVE-OR gate having a first input receiving the output signal of the further flip-flop, a second input receiving the at least one clock signal, and an output supplying the output signal of the test circuit.

In accordance with an additional feature of the invention, there are provided means for delaying an undelayed signal to be synchronized a first and a second time for supplying once-delayed and twice-delayed signals; the test circuit having a further input receiving a further clock signal not overlapping the at least one clock signal; the data input of the clock-controlled flip-flop receiving the once-delayed signal; the clock-controlled flip-flop being formed of first and second series-connected other clock-controlled flip-flops having clock inputs; the clock input of the second other clock-controlled flip-flop receiving the further clock signal; the clock input of the first other clock-controlled flip-flop receiving the output signal of the test circuit; the test circuit receiving the undelayed signal and the twice-delayed signal; the test circuit including third, fourth, fifth, sixth and seventh further clock-controlled flip-flops having clock inputs, data inputs, and data outputs supplying data output signals; the clock inputs of the third and fifth further flip-flops being connected to the output of the test circuit, the clock inputs of the fourth and sixth further flip-flops receiving the further clock signal; the data input of the third further flip-flop receiving the undelayed signal, the data input of the fifth further flip-flop receiving the twice-delayed signal; the data output of the third further flip-flop being connected to the data input of the fourth further flip-flop; the data output of the fifth further flip-flop being connected to the data input of the sixth further flip-flop; the test circuit including an EXCLUSIVE-OR gate having first and second inputs and one output supplying an output signal; the data output signals of the fourth and sixth further flip-flops being respectively supplied to the first and second inputs of the EXCLUSIVE-OR gate; the output signal of the EXCLUSIVE-OR gate being supplied to the data input of the seventh further flip-flop, the output signal of the seventh further flip-flop being inverted when a logical "1" is present at the data input of the seventh further flip-flop and being maintained when a logical "0" is present at the data input of the seventh further flip-flop; and the test circuit including an OR gate having an output connected to the output of the test circuit, a first input receiving the at least one clock signal and a second input connected to the output of the seventh further flip-flop.

In accordance with yet another feature of the invention, there is provided an additional flip-flop having an input connected to the output of the clock-controlled flip-flop, a clock input receiving the at least one clock signal, and an output supplying the pulse-shaped signal synchronized with the clock signal.

In accordance with yet a further feature of the invention, the test circuit ascertains a phase difference between the leading edge of the pulse-shaped signal and a weighting edge of the output signal.

In accordance with a concomitant feature of the invention, the test circuit ascertains a phase difference between a trailing edge of the pulse-shaped signal and a weighting edge of the output signal.

Other features which are considered as characteristic for the invention are set forth in the appended claims.

Although the invention is illustrated and described herein as embodied in a synchronization circuit configuration, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

FIG. 1 is a schematic and block circuit diagram of a basic circuit configuration according to the invention;

FIG. 2 is a circuit diagram of a first exemplary embodiment of the configuration of FIG. 1;

FIG. 3 is a circuit diagram of a second exemplary embodiment of the configuration of FIG. 1;

DESCRIPTION OF THE PREFERRED EMBODIMENT

Figure 4:
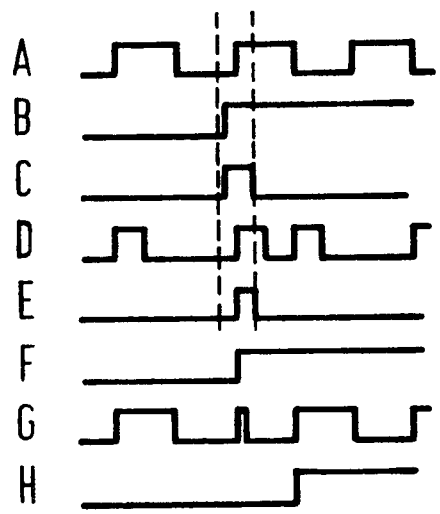
FIG. 4 is a graph showing the course of eight signals of the circuit configuration shown in FIG. 2, as plotted over time.

Referring now to the figures of the drawing in detail and first, particularly, to FIG. 1 thereof, there is seen a basic circuit diagram which includes a clock-controlled flip-flop 2 and a test circuit configuration 4. The test circuit configuration 4 has first and second inputs and one output. A pulse-shaped signal to be synchronized is supplied to a data input of the flip-flop 2 and to the first input of the test circuit configuration 4 through a first input terminal 1. The second input of the test circuit configuration 4 receives a clock signal through a second input terminal 5. The test circuit 4 generates an output signal, which is supplied to a clock input of the clock-controlled flip-flop 2. A synchronized signal is present at a data output of the flip-flop 2 and can be picked up at an output terminal 3.

For purposes of explaining the function of the device, it is assumed that the data signal is a pulse train, and that the edges of the pulse train are located within the logical "1" regions of the clock signal. It is also assumed that the edges of the pulse train are located outside the region of the weighted clock signal edges that leads to jittering. The frequency of the data signal is intended to be low as compared to the frequency of the clock signal. In this case, weighting with both the leading and the trailing edge would result in an unequivocal association of the signal state with the instant of weighting. If it is assumed that the frequency of the clock signal then increases minimally, then the weighting edge of the clock signal would slowly enter the range of the edge of the signal to be synchronized. If the edge of the signal to be synchronized is then located within a defined region, the test circuit recognizes this and switches the weighting over to a clock signal that is phase-offset from the previous clock signal. This phase-offset clock signal may, for instance, be a clock signal that does not overlap the previous clock signal or the inverted clock signal. In this way, jittering is reliably avoided.

The circuit configuration according to the invention as shown in FIG. 2 again has a clock-controlled flip-flop 2 having the data input thereof connected to the first input terminal 1 and the data output thereof connected to the output terminal 3. The test circuit 4 includes a first differentiator 6 having an input connected to the input terminal 1. An output of the first differentiator 6 is carried to a first input of a logical AND gate 8. An output of the logical AND gate 8 is connected to an input of a further flip-flop 9. The further flip-flop 9 is not clock-controlled, and when there is a pulse at the input of the flip-flop 9, it inverts the logical state of an output thereof. The output of the flip-flop 9 is connected to a first input of an EXCLUSIVE-OR gate 10. A second input of the EXCLUSIVE-OR gate 10 is acted upon by the signal that is present at the second input terminal 5. The output of the EXCLUSIVE-OR gate 10 is connected to the output of the test circuit and thus to the clock input of the first flip-flop 2, as well as to the input of a second differentiator 7. The output of the second differentiator 7 is connected to a second input of the AND gate 8.

The mode of operation will be described in detail below in conjunction with FIG. 4, which shows the course over time of eight signals, at points marked A to H in FIG. 2. A clock signal A of FIG. 4 is present at the input terminal 5, and a pulse-shaped data signal B, which has a many times lower frequency, is applied to the input terminal 1. If a leading edge occurs at the input of the differentiator 6, the differentiator 6 forms a pulse of predefined width at its output. The same process takes place with leading edges of a synchronized clock signal G on the part of the differentiator 7. The course of pulses formed by the differentiators 6, 7 over time is shown at reference symbols C and D in FIG. 4. Both signals formed by the differentiators 6, 7 are logically linked through the AND gate 8. A logical signal E is present at the output of the AND gate 8 and indicates whether or not the leading edge of the data signal B is located inside a predetermined region of the leading edges of the synchronizing clock signal G. The size of this region is determined by the differentiators 6, 7 and can be selected within a wide range.

If a leading edge of the data signal B is located within a predefined region (drawn in broken lines in FIG. 4 as an example), then a short pulse is generated at the output of the AND gate 8. This pulse inverts the logical state of the data output of the second flip flop 9. Either the clock signal or the inverted clock signal is then carried to the clock input of the clock-controlled flip-flop 2, as a function of the logical state of the flip-flop 9. An EXCLUSIVE-OR gate 10 makes this simple to accomplish. If a logical "0" is present at the first input of the EXCLUSIVE-OR gate 10, then the output signal of the EXCLUSIVE-OR gate is equal to the clock signal present at the second input terminal. If a logical "1" is present at the first input of the EXCLUSIVE-OR gate 10, then the output signal is equal to the clock signal inverted at the second input terminal. If the synchronized signal is to be synchronized exclusively with the clock signal preset at the input terminal 5, then the signal that can be picked up at the output terminal 3 would have to be carried through a further flip-flop (which is not shown in FIG. 2) having a clock input which is connected to the input terminal 5.

The exemplary embodiment of the invention shown in FIG. 2 enables a simple realization of the basic circuit diagram shown in FIG. 1, while requiring only one clock signal. Furthermore, because only one clock-controlled flip-flop 2 is used, a short signal transit time is assured. Naturally, a realization according to the invention that has corresponding flip-flops 2 and differentiators 6, 7 which assures weighting with the trailing edges of the clock signal, is equally possible. The test circuit configuration shown in FIG. 2 compares only the phase difference between the weighting edges and the leading edges of the data signal. This is usually adequate for jitter-free synchronizing of data signals. If the trailing edges are also to be detected by the test circuit, then the differentiator 6 would have to form a corresponding pulse of defined length for the trailing edges as well. The circuit configuration which is shown can also be easily produced by MOS technology.

The second exemplary embodiment shown in FIG. 3 includes first and second delay elements 11, 12 which are connected in series. An input of the first delay element 11 is connected to the first input terminal 1. The circuit configuration of FIG. 3 also includes first and second series-connected clocked flip-flops 14, 17. A data input of the first flip-flop 14 is connected to a center pickup of the series-connected delay elements 11, 12. A data output of the first flip-flop 14 is connected to a data input of the second flip-flop 17. Third, fourth, fifth and sixth flip-flops 13, 16, 15, 18 are also provided. A data input of the third flip-flop 13 is acted upon by the signal present at the first input terminal 1. A data output of the third flip-flop 13 is connected to the data input of the fourth flip-flop 16, and a data output of the fifth flip-flop 15 is connected to a data input of the sixth flip-flop 18. A data input of the fifth flip-flop 15 is connected to an output of the second delay element 12. Clock inputs of the first, third and fifth flip-flops 14, 13, 15 are acted upon by an output signal of an OR gate 20. Clock inputs of the second, fourth and sixth flip-flops 17, 16, 18 are connected to a second input terminal 23. Data outputs of the fourth and sixth flip-flops 16, 18 are supplied to two inputs of an EXCLUSIVE-OR gate 21. An output of the EXCLUSIVE-OR gate 21 is connected to a data input of a seventh flip-flop 19. A data output of the second flip-flop 17 is connected to a data input of a further, eighth flip-flip 22. An output signal of the eighth flip-flop 22 is supplied to the output terminal 3. A third input terminal 5 is connected to clock inputs of the eighth flip-flop 22 and the seventh flip-flop 19 and to a first input of the OR gate 20. An output signal of the eighth flip-flop 19 is supplied to a second input of the OR gate 20.

Figure 5:
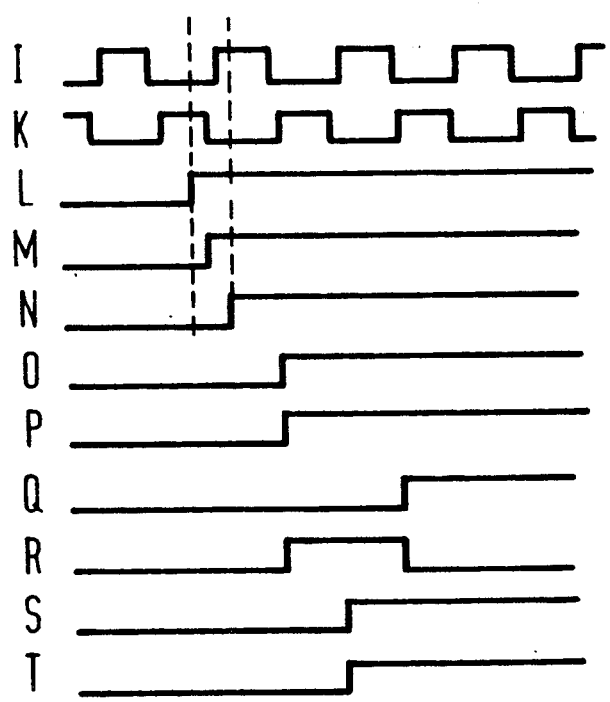
FIG. 5 is a graph showing the course of eleven signals of the circuit configuration shown in FIG. 3, as plotted over time.

The mode of operation will be described in further detail in conjunction with FIG. 5, which shows a course of 11 signals over time at locations marked I to T in FIG. 3. A first clock signal I is present at the input terminal 5. A second clock signal K that does not overlap the first clock signal I is present at the second input terminal 23. In this case, the clock-controlled flip-flop 2 of FIG. 1 is formed by the series-connected flip-flops 14, 17. In this case, the test circuit 4 of FIG. 1 includes the flip-flops 13, 16 and 15, 18, the EXCLUSIVE-OR circuit 21, the flip-flop 19, the OR gate 20, and the two delay elements 11, 12. All of the flip-flops are constructed in such a way that when there is a logical "1" at the clock input of such a flip-flop, the signal at the data output is equal to the signal at the data input, and the signal present at that instant at the data input is stored in memory at the data output, by means of a trailing edge at the clock input.

The data signal L reaches the data input of the clock-controlled flip-flop 14 through the first delay element 11. In FIG. 5, this signal is represented by reference symbol M. The data signal L and the twice-delayed data signal N are carried through the flip-flop stages 13, 16; 15, 18 to the EXCLUSIVE-OR gate 21. If the output of the seventh flip-flop 19 and thus the signal S is logical "0", then the clock signal present at the second input terminal 5 is present at the clock inputs of the flip-flops 13, 14, 15. If the edges of the data signal M are located outside a predefined region of the weighted edges of the clock signal I, then the data signal M is synchronized with the first clock signal I through the three flip-flop stages, 14, 17, 22.

The signals O and Q indicate whether or not an edge of the data signal M is located inside a certain predetermined region of the weighted clock edges of the clock signal I. If this is the case, then the signals O and Q are different, and they invert the signal S at the output of the seventh flip-flop 19. If the signal S is logical "1", then a logical "1" is also present at the clock input of the flip-flops 13, 14, 15. The weighting of the data signal which is present at the input terminal 23, is then effected with the second clock signal K by the flip-flop 17 and its testing is effected by the flip-flops 16 and 18. The eighth flip-flop 22 takes over a jitter-free data signal P and synchronizes it with the clock signal I. The flip-flop 22 can be omitted in certain applications, as already mentioned in the description of FIG. 2. The resultant synchronized data signal is shown at reference symbol T in FIG. 5.

Figure 6:
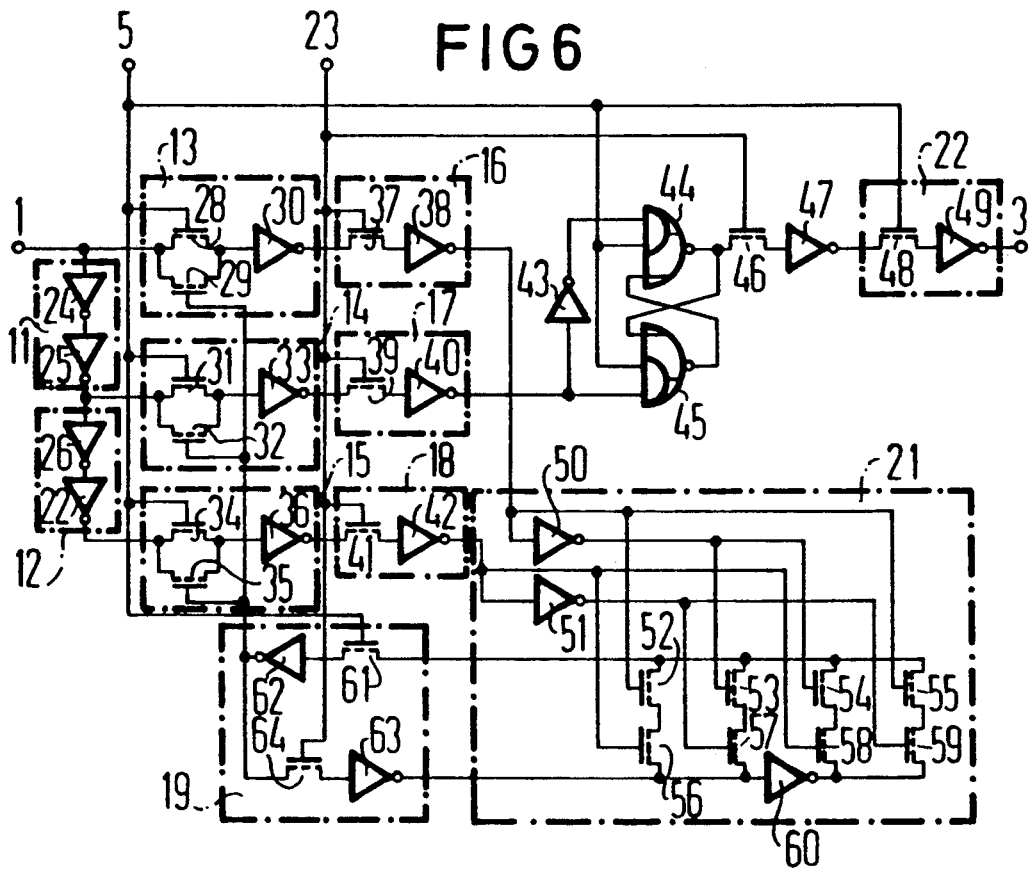
FIG. 6 is a circuit diagram of a possible structure of the circuit configuration shown in FIG. 3.

FIG. 6 shows the exemplary embodiment of FIG. 3 in an MOS version. The time delay elements 11, 12 are each formed by two respective series-connected inverters 24, 25; 26, 27, and the flop-flops 13, 14, 15 are each formed by respective first and second field effect transistors 28, 29; 31, 32; 34, 35 and one respective inverter 30; 33; 36. The load paths of the two transistors 28, 29; 31, 32; 34, 35 are connected in parallel. Interconnected drain terminals of the transistors 28, 29; 31, 32; 34, 35 are connected to the data inputs of the respective flip-flops 13, 14, 15. Interconnected source terminals of the transistors 28, 29; 31, 32; 34, 35 are connected to inputs of the respective inverters 30; 33; 36. Outputs of the inverters 30; 33; 36 are connected to respective outputs of the flip-flops 13, 14, 15. Gate terminals of the first transistors 28; 31; 34 are connected to the input terminal 5, and gate terminals of the second transistors 29; 32; 35 of each pair are connected to the data output of the flip-flop 19.

The flip-flops 16, 17, 18, 22 are each formed by one respective field effect transistor 37; 39; 41; 48 and one respective inverter 38; 40; 42; 49. In this case, drain terminals of the transistors 37; 49; 41; 48 are again connected to the respective data inputs of the flip-flops 16, 17, 18, 22, and source termiansl of the transistors 37, 39, 41, 48 are connected to respective inputs of the inverters 38, 40, 42 49. The output of the inverters are connected to the respective data outputs of the flip-flops 16, 17, 18, 22.

The exclusive OR gate 21 includes four pairs of transistors 52 . . . 59 having load paths which are connected in series, as well as first, second and third inverters 60, 50, 51. The EXCLUSIVE-OR gate 21 shown herein has one additional input. An output signal of the EXCLUSIVE-OR gate 21 is supplied by interconnected drain terminals of first transistors 52 . . . 55 of the transistor pairs. A further input is connected to source terminals of second transistors 56, 57 of the first two transistor pairs and to the input of the first inverter 60. The output of the first inverter 60 is connected to the source terminals of the second transistors 58, 59 of the third and fourth pairs of transistors. A first data input of the EXCLUSIVE-OR gate 21 is connected both to the gate terminals of the first transistors 52, 55 of the first and fourth transistor pairs and to the input of the second inverter 50. The output of the second inverter 50 is connected to the gate terminals of the first transistors 53, 54 of the second and third transistor pairs. In the same manner, a second data input is connected both to the gate terminals of the second transistors 56, 58 of the first and third pairs of transistors, and through the third inverter 51 to the gate terminals of the second transistors 57, 59 of the second and fourth pairs of transistors.

The flip-flop 19 has two series-connected flip-flops. These two flip-flops are each made up of one field effect transistor 61; 64 and one inverter 62; 63, in the same way as the flip-flops 16, 17, 18 and 22. A drain terminal of a first one of the transistors 61 is acted upon by the output signal of the EXCLUSIVE-OR gate, and a gate terminal thereof is connected to the first input terminal 5. A gate terminal of a second one of the transistors 64 is connected to the input terminal 23, and the output of the inverter 63 is connected to the further input of the EXCLUSIVE-OR gate 21. The series circuit of the two flip-flops 61, 62; 63, 64 is provided with a center pickup, which is connected to the gate terminals of the transistors 29, 32, 35.

Gates 44, 45 and an inverter 43 form a D flip-flop receiving an input signal from the output of the flip-flop 17, and supplying an output signal to a flip-flop formed by a transistor 46 and an inverter 47. The data input of the flip-flop 22 is acted upon by the output signal of the inverter 47.

The mode of operation corresponds to that described for FIG. 3. The two additional flip-flops 43 . . . 47 between the data output of the flip-flop 17 and the data input of the flip-flop 22 assure amplification of the data signal synchronized by the flip-flop stages 14 and 17. This is necessary because the preceding flip-flop stages 14, 17 are each formed by only one transistor and one inverter stage connected to its output. The input capacitance of the inverter stage serves as a holding capacitance and is quite low. If the same signal is present at both inputs of the EXCLUSIVE-OR gate 21, then the further input is short-circuited to the output of the EXCLUSIVE-OR gate 2 either through the first transistor pair 52, 56 or through the second transistor pair 53, 57.

If different signals are present at the data inputs, then the third or fourth pair of transistors is made conducting, and thus the signal present at the further input is inverted by the inverter 60 and carried to the output. The flip-flop 19 stores this signal. If a logical "1" is present at the output of the flip-flop 19, then the transistors 29, 32, 35 are made conducting. As a result, the synchronization with the clock signal present at the input terminal 5 is deactivated. The synchronization is then effected through the clock pulse present at the input terminal 23.

Figure 7:
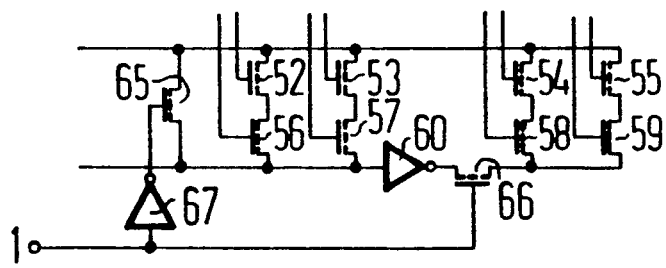
FIG. 7 is a circuit diagram of an EXCLUSIVE-OR circuit for weighting a leading edge.
Figure 8:
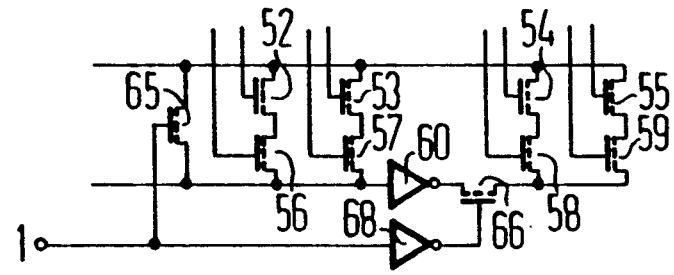
FIG. 8 is a circuit diagram of an EXCLUSIVE-OR circuit for weighting a trailing edge.

FIGS. 7 and 8 show expanded EXCLUSIVE-OR gates, which enable synchronization of the leading or trailing edge of the input signal. The EXCLUSIVE-OR gate shown in FIG. 7 is expanded by first and second additional field-effect transistors 65, 66 and one inverter 67. A drain terminal of the first transistor 65 is connected to the output of the EXCLUSIVE-OR gate. A source terminal of the transistor 65 is connected to the further input of the EXCLUSIVE-OR gate. The load path of the second further transistor 66 is connected between the output of the inverter 60 and source terminals of the transistors 58 and 59. The gate terminal of the first further transistor 65 is connected to an output of the additional inverter 67. An input of the additional inverter 67 and the gate terminal of the second further transistor 66 are acted upon by the signal present at the first input terminal 1.

The expanded EXCLUSIVE-OR gate shown in FIG. 8 is equivalent to that shown in FIG. 7 except that the gate terminal of the second further transistor 66 is connected to an output of a further inverter 68, and the gate terminal of the further transistor 65 and an input of the further inverter 68 are connected to the first input terminal. The inverter 67 is omitted in this case.

If there is a logical "0" at the input terminal 1, the EXCLUSIVE-OR gate shown in FIG. 7 is deactivated by the transistors 65 and 66. The same is true for the EXCLUSIVE-OR gate shown in FIG. 8 if there is a logical "1" at the input terminal 1. When there is a leading edge at the input terminal 1, the EXCLUSIVE-OR gate shown in FIG. 7 is activated. The function is then equivalent to what has been described for FIG. 6. The same is true for a trailing edge at the input terminal 1 for the EXCLUSIVE-OR gate shown in FIG. 8.

The circuits shown in FIGS. 1 to 3 and 6 to 8 can be used for any electronic circuit, with suitable modification.

We claim:

1. A circuit configuration for synchronizing pulse-shaped signals, comprising:
   a clock-controlled flip-flop having a data input for receiving a pulse-shaped signal to be synchronized, a data output for supplying a synchronized signal, and a clock input;
   a test circuit having an input connected to the data input of said clock-controlled flip-flop for receiving the pulse-shaped signal to be synchronized, another input for receiving at least one clock signal, and an output connected to the clock input of said clock-controlled flip-flop;
   said test circuit having means for generating an output signal at the output of said test circuit to be supplied to the clock input of said clock-controlled flip-flop being equal to or phase-offset relative to the at least one clock signal supplied to the other input of said test circuit;

said test circuit having means for ascertaining a phase difference between an edge of the pulse-shaped signal to be weighted and a weighting edge of the output signal of said test circuit; and means for switching the output signal of said test circuit to the other respective clock signal if the phase difference is below a predefined value.

2. The circuit configuration for synchronizing pulse-shaped signals according to claim 1, wherein said means for switching the output signal of said test circuit invert the at least one clock signal.

3. The circuit configuration for synchronizing pulse-shaped signals according to claim 1, wherein said means for ascertaining the phase difference include a first differentiator receiving the pulse-shaped signal to be synchronized and supplying an output signal; a second differentiator receiving the output signal of said test circuit and supplying an output signal; and a logical AND gate receiving the output signals of said differentiators and supplying an output signal.

4. The circuit configuration for synchronizing pulse-shaped signals according to claim 3, including a further flip-flop having a data input receiving the output signal of said AND gate and an output supplying an output signal; an EXCLUSIVE-OR gate having a first input receiving the output signal of said further flip-flop, a second input receiving the at least one clock signal, and an output supplying the output signal of said test circuit.

5. The circuit configuration for synchronizing pulse-shaped signals according to claim 1, including:

means for delaying an undelayed signal to be synchronized a first and a second time for supplying once-delayed and twice-delayed signals;

said test circuit having a further input receiving a further clock signal not overlapping said at least one clock signal;

the data input of said clock-controlled flip-flop receiving the once-delayed signal;

said clock-controlled flip-flop being formed of first and second series-connected other clock-controlled flip-flops having clock inputs;

the clock input of said second other clock-controlled flip-flop receiving the further clock signal;

the clock input of said first other clock-controlled flip-flop receiving the output signal of said test circuit;

said test circuit receiving the undelayed signal and the twice-delayed signal;

said test circuit including third, fourth, fifth, sixth and seventh further clock-controlled flip-flops having clock inputs, data inputs, and data outputs supplying data output signals;

the clock inputs of said third and fifth further flip-flops being connected to the output of said test circuit, the clock inputs of said fourth and sixth further flip-flops receiving the further clock signal;

the data input of said third further flip-flop receiving the undelayed signal, the data input of said fifth further flip-flop receiving the twice-delayed signal;

the data output of said third further flip-flop being connected to the data input of said fourth further flip-flop;

the data output of said fifth further flip-flop being connected to the data input of said sixth further flip-flop;

said test circuit including an EXCLUSIVE-OR gate having first and second inputs and one output supplying an output signal;

the data output signals of said fourth and sixth further flip-flops being respectively supplied to said first and second inputs of said EXCLUSIVE-OR gate;

the output signal of said EXCLUSIVE-OR gate being supplied to the data input of said seventh further flip-flop, the output signal of said seventh further flip-flop being inverted when a logical "1" is present at the data input of said seventh further flip-flop and being maintained when a logical "0" is present at the data input of said seventh further flip flop; and said test circuit including an OR gate having an output connected to the output of said test circuit, a first input receiving the at least one clock signal and and a second input connected to the output of said seventh further flip-flop.

6. The circuit configuration for synchronizing pulse-shaped signals according to claim 5, including an additional flip-flop having an input connected to the output of said clock-controlled flip-flop, a clock input receiving the at least one clock signal, and an output supplying the pulse-shaped signal synchronized with the clock signal.

7. The circuit configuration for synchronizing pulse-shaped signals according to claim 1, including an additional flip-flop having an input connected to the output of said clock-controlled flip-flop, a clock input receiving the at least one clock signal, and an output supplying the pulse-shaped signal synchronized with the clock signal.

8. The circuit configuration for synchronizing pulse-shaped signals according to claim 1, wherein said test circuit ascertains a phase difference between the leading edge of the pulse-shaped signal and a weighting edge of the output signal.

9. The circuit configuration for synchronizing pulse-shaped signals according to claim 1, wherein said test circuit ascertains a phase difference between a trailing edge of the pulse-shaped signal and a weighting edge of the output signal.

* * * * *